United States Patent
Fung et al.

(10) Patent No.: US 12,373,774 B2
(45) Date of Patent: Jul. 29, 2025

(54) COUNTING MACHINE AND METHODS OF COUNTING ITEMS

(71) Applicant: Avery Dennison Retail Information Services LLC, Mentor, OH (US)

(72) Inventors: Calvin Fung, New Territories (HK); Dominic Tse, New Territories (HK)

(73) Assignee: Avery Dennison Retail Information Services LLC, Mentor, OH (US)

( * ) Notice: Subject to any disclaimer, the term of this patent is extended or adjusted under 35 U.S.C. 154(b) by 255 days.

(21) Appl. No.: 17/760,376

(22) PCT Filed: Feb. 12, 2021

(86) PCT No.: PCT/US2021/017900
§ 371 (c)(1),
(2) Date: Aug. 9, 2022

(87) PCT Pub. No.: WO2021/163522
PCT Pub. Date: Aug. 19, 2021

(65) Prior Publication Data
US 2023/0092460 A1    Mar. 23, 2023

(30) Foreign Application Priority Data

Feb. 14, 2020 (CN) .................. 202010095106.X

(51) Int. Cl.
*G06Q 10/087* (2023.01)
*G01B 21/02* (2006.01)
(Continued)

(52) U.S. Cl.
CPC ........... *G06Q 10/087* (2013.01); *G01B 21/02* (2013.01); *G01G 19/42* (2013.01); *G06M 1/108* (2013.01); *G06M 9/00* (2013.01)

(58) Field of Classification Search
CPC .... G06Q 10/087; G06Q 20/203; G07F 11/00; G07F 9/00; G07F 11/42; G07F 9/026;
(Continued)

(56) References Cited

U.S. PATENT DOCUMENTS

| 3,808,692 A | 5/1974 | Gartner |
| 4,417,351 A | 11/1983 | Williamson et al. |

(Continued)

FOREIGN PATENT DOCUMENTS

| CN | 103129783 | 6/2013 |
| CN | 105981059 | 9/2016 |

(Continued)

OTHER PUBLICATIONS

International Preliminary Report on Patentability dated Aug. 11, 2021 issued in corresponding IA No. PCT/US2021/017900 filed Feb. 12, 2021.

(Continued)

*Primary Examiner* — Florian M Zeender
*Assistant Examiner* — Vanessa Deligi

(57) ABSTRACT

In some embodiments, a counting machine may include a counting area configured to count a plurality of items. The counting area may include a fixed pressure plate, a movable pressure plate, and one or more sensors configured to measure the distance between the fixed pressure plate and the movable pressure plate, and a processor configured to determine the number of items in the counting area by comparing a sampled thickness value to the thickness of the items located between the fixed pressure plate and the movable pressure plate.

21 Claims, 2 Drawing Sheets

(51) Int. Cl.
*G01G 19/42* (2006.01)
*G06M 1/10* (2006.01)
*G06M 9/00* (2006.01)

(58) Field of Classification Search
CPC .......... G07F 9/001; G07F 11/02; G07F 11/26;
G07F 11/38; G07F 13/10; G07F 17/40;
G07F 17/42; G07F 5/18; G07F 7/0609;
G07F 7/10; G07F 9/002; G07F 9/10;
A47F 1/126; A47F 1/04; A47F 1/125;
A47F 3/02; A47F 3/14; A47F 5/0025;
A47F 5/005; A47F 5/0068; A47F 5/0093;
A47F 7/0007; A47F 7/28; A47F 7/281
See application file for complete search history.

(56) References Cited

U.S. PATENT DOCUMENTS

| | | | | |
|---|---|---|---|---|
| 7,792,711 | B2* | 9/2010 | Swafford, Jr. | G06Q 10/087 |
| | | | | 705/28 |
| 10,001,402 | B1 | 6/2018 | Gyori et al. | |
| 10,238,142 | B1 | 3/2019 | Haddad | |
| 10,809,122 | B1* | 10/2020 | Danenberg | A47F 5/103 |
| 11,635,358 | B2* | 4/2023 | Roszman | G01N 29/043 |
| | | | | 73/596 |
| 11,790,190 | B2* | 10/2023 | Mei | G06K 7/081 |
| | | | | 235/451 |
| 2002/0178694 | A1 | 12/2002 | Jones et al. | |
| 2008/0015956 | A1 | 1/2008 | Regard | |
| 2012/0310570 | A1 | 12/2012 | Pyne et al. | |
| 2013/0002422 | A1* | 1/2013 | Wiese | G08B 13/08 |
| | | | | 340/539.1 |
| 2013/0144431 | A1 | 6/2013 | Tidhar et al. | |
| 2014/0008382 | A1 | 1/2014 | Christianson | |
| 2015/0217059 | A1* | 8/2015 | Ashby | A61M 5/31511 |
| | | | | 604/189 |
| 2016/0109281 | A1* | 4/2016 | Herring | G06Q 30/0235 |
| | | | | 177/1 |
| 2017/0202369 | A1 | 7/2017 | Mercier et al. | |
| 2019/0087769 | A9 | 3/2019 | Glasgow et al. | |
| 2019/0282000 | A1* | 9/2019 | Swafford | A47F 10/02 |
| 2020/0043273 | A1* | 2/2020 | Vazquez | G07F 11/165 |
| 2021/0158646 | A1* | 5/2021 | Chang | G07F 11/38 |
| 2021/0174630 | A1* | 6/2021 | Ibe | G07F 11/1653 |
| 2021/0247227 | A1* | 8/2021 | Furukawa | G01G 19/4144 |

FOREIGN PATENT DOCUMENTS

| | | |
|---|---|---|
| CN | 110232773 | 9/2019 |
| EP | 1760020 | 3/2007 |
| FR | 2629237 | 9/1989 |
| JP | 57-138007 | 8/1982 |
| JP | 61-225619 | 10/1986 |
| JP | 3-236878 | 10/1991 |
| JP | 7-146925 | 6/1995 |
| JP | 2001-199508 | 7/2001 |
| WO | 2019/107031 | 6/2019 |

OTHER PUBLICATIONS

International Search Report and Written Opinion dated Apr. 22, 2021 issued in corresponding IA No. PCT/US2021/017900 filed Feb. 12, 2021.

* cited by examiner

COUNTING MACHINE AND METHODS OF COUNTING ITEMS

CROSS-REFERENCE TO RELATED APPLICATION

The present application is a 371 of International Application No. PCT/US2021/017900, which was published in English on Aug. 19, 2021, and claims the benefit of Chinese Patent Application No. 202010095106X filed Feb. 14, 2020, both of which are incorporated herein by reference in their entireties.

TECHNICAL FIELD

The present disclosure generally relates to counting machines and methods of counting items using a counting machine.

BACKGROUND

Modern production systems increasingly rely upon having highly accurate inventory. Such information about inventory systems can allow for more efficient and cost-effective operations. Certain production processes including lean manufacturing and just-in-time manufacturing, require even more accurate inventory systems to enable continuous operations and reduce excess stock during production. However, for small or loose items, accurate counting of stock using manual methods for inventory purposes can be both inaccurate and time consuming.

SUMMARY

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In some embodiments, a counting machine may include a counting area configured to count a plurality of items. The counting area may include a fixed pressure plate, a movable pressure plate, and one or more sensors configured to measure the distance between the fixed pressure plate and the movable pressure plate, and a processor configured to determine the number of items in the counting area by comparing a sampled thickness value to the thickness of the items located between the fixed pressure plate and the movable pressure plate.

In some embodiments, the movable pressure plate may be actuatable by a control signal sent by the processor. The movable pressure plate may be actuatable by a motor. The movable pressure plate may be actuatable by a user. The thickness of the items located between the fixed pressure plate and the movable pressure plate may be measured at a predefined force. The sampled thickness value may be determined by providing a known number of items to the processor and measuring the thickness of the known number of items in the counting area. The sampled thickness value may be an average value of two or more measurements. The sampled thickness value may be stored by the processor.

In some embodiments, the counting machine further may include a scale, and a user interface. The processor may be configured to use the user interface to provide a count of items placed on the scale based on a sampled weight value.

In some embodiments, a method of counting items using a counting machine may include receiving a plurality of items in a counting area of a counting machine, measuring the thickness of the plurality of items, and determining the number of items based on the thickness of the plurality of items and a sampled thickness value. The counting machine may include a counting area. The counting area may include a fixed pressure plate, a movable pressure plate, and one or more sensors configured to measure the distance between the fixed pressure plate and the movable pressure plate, and a processor connected to the one or more sensors.

In some embodiments, the method further may include generating the sampled thickness value based on at least one measurement of the thickness of a known number of items. The sampled thickness value may be generated by averaging a plurality of measurements.

In some embodiments, the sampled thickness value may be saved from a previous measurement. The movable pressure plate may be electronically actuatable by the counting machine and wherein the counting machine actuates the movable pressure plate and measures the thickness of the plurality of items. The plurality of items comprise either paper labels or fabric labels. The plurality of items may include radio-frequency identification ("RFID") tags, and wherein the measurement may be performed using a predefined force that may be sufficiently low to avoid damaging the RFID tags. The number of items may be determined using the method within 10 seconds.

In some embodiments, the counting machine further may include a scale and a user interface. The method further may include receiving the plurality of items on the scale, measuring the weight of the plurality of items, and determining the number of items based on the weight of the plurality of items and a sampled weight value. The method further may include generating the sampled weight value based on at least one measurement of the weight of a known number of items. The sampled weight value may be generated by averaging a plurality of measurements.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

DETAILED DESCRIPTION

Figure 2:
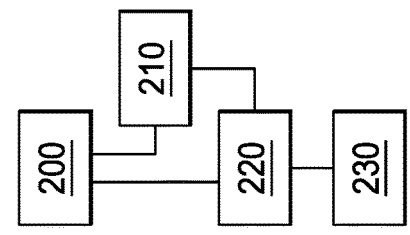
FIG. 2 depicts a flowchart illustrating exemplary operations to count a plurality of items using a counting machine according to some embodiments.
Figure 1:
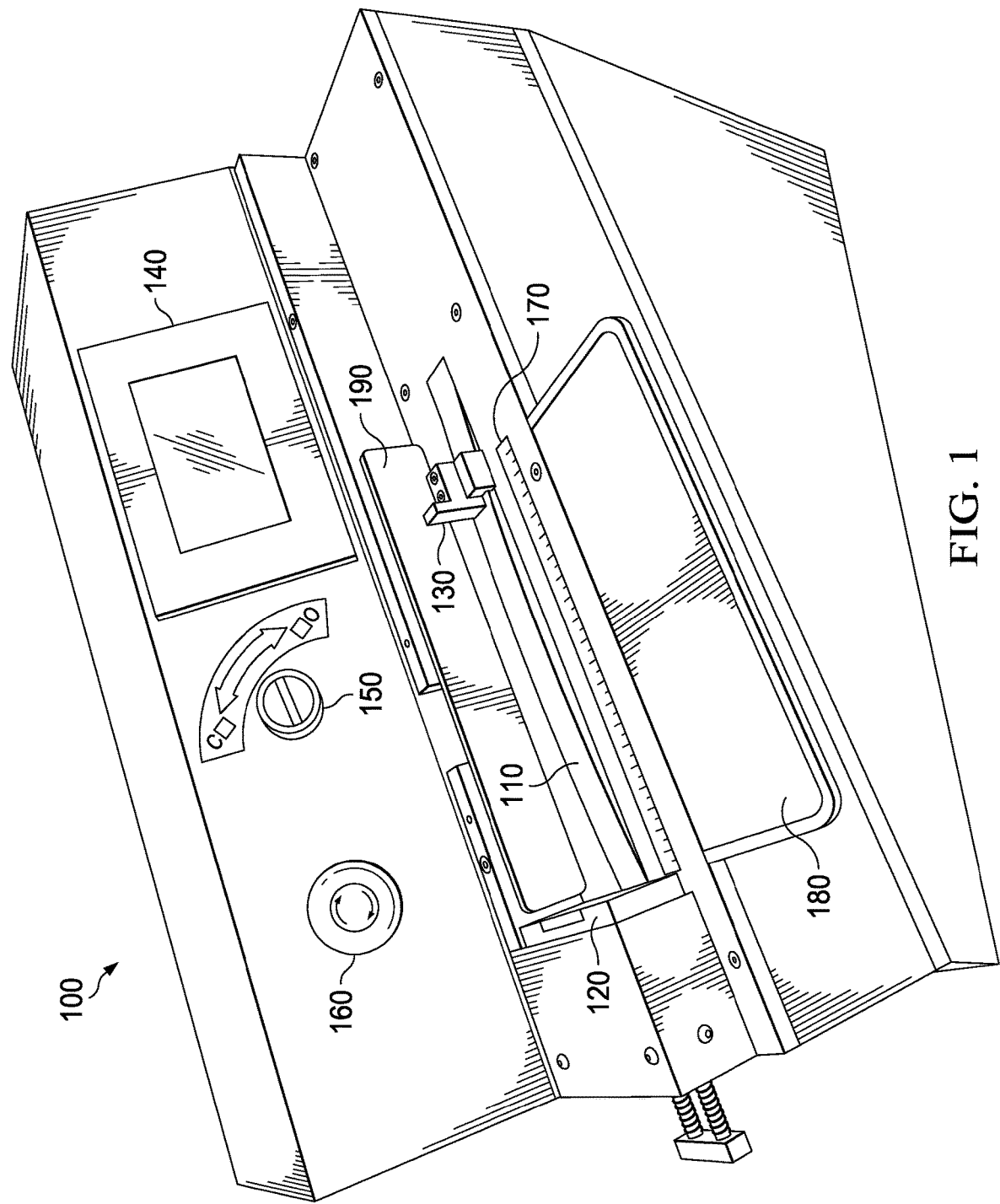
FIG. 1 depicts a perspective view of a counting machine according to some embodiments.
Figure 3:
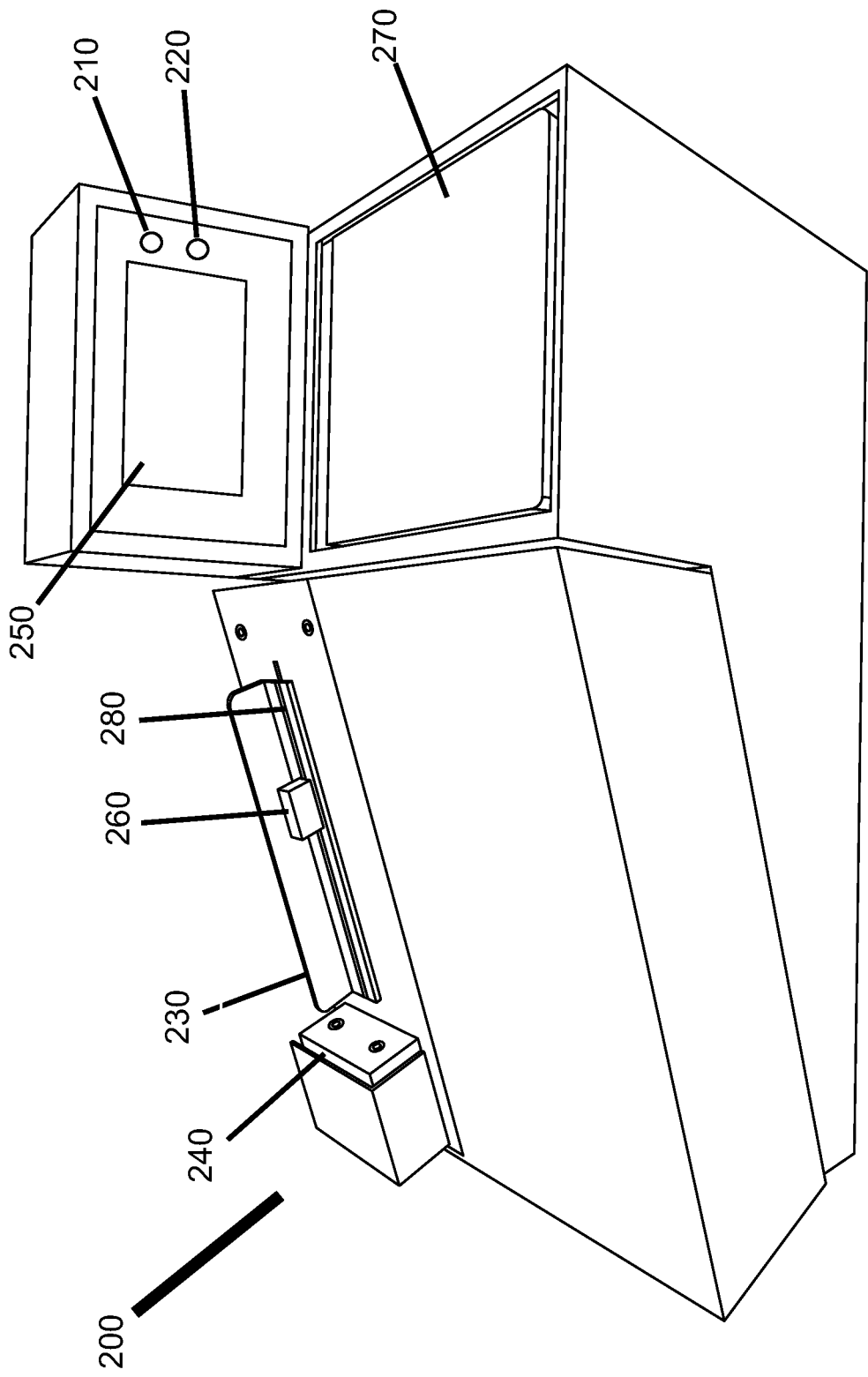
FIG. 3 depicts a perspective view of a counting machine according to some embodiments.

The systems and methods disclosed herein are described in detail by way of examples and with reference to FIGS. 1-3. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The present disclosure generally describes counting machines and methods of counting a plurality of items using the counting machines. The described counting machines and methods are particularly suitable for counting substantially planar items such as fibrous and textile materials.

As can be appreciated, counting, or enumeration, of small and/or loose items using conventional counting processes is difficult due to the need to physically manipulate each item to be counted individually. Such physical manipulation can be slow, inaccurate, and can cause repetitive stress injuries.

Additionally, items may also need to be counted at multiple stages of a modern production process. For example, items need to be counted for inventory management purposes at a warehouse, be counted for distribution to the production floor, and then be counted again before distribution to individual workers. Issues can arise if the count of items is inaccurate at any of these stages. For example, a production process may have too few, or too many, labels to attach to a garment if the labels were inaccurately counted using a conventional counting process.

As can be appreciated, performing any of these counting processes using conventional manual counting processes can be extremely time consuming and take the equivalent of hundreds of man hours. In certain embodiments, the counting machines and methods described herein can measure a batch of hundreds of items in about 10 seconds or less. Additionally, or alternatively, the counting machines and methods described herein can facilitate a time savings of about 35% or greater, about 50% or greater, about 75% or greater, about 90% of greater, about 95% or greater, about 98% greater, or about 99% greater than manual counting processes.

The counting machines and methods described herein can generally be suitable for the counting of any substantially planar item and can obviate the above-described issues and time issues by accurately and quickly counting such items. For example, the counting machines and methods described herein can count fibrous and textile materials including labels, tags, textile samples, cardboard or other paperboard, tissue paper, planar plastics (e.g., plastic inserts), and even other planar items like buttons. The labels can be paper labels, fabric labels including printed fabric labels ("PFLs"), hang tags, woven labels, shoe tongue labels, size strips, heat transfer labels ("HTLs"), folded booklets, and packets. As can be appreciated, such items can be particularly suitable for garment manufacturing such as, for example, use-and-care labels and pricing labels.

In certain embodiments, the planar items can generally be of any width and height so long as they can fit, or be supported by, the counting machines described herein. For example, the items can vary from dimensions of about 5 mm by 5 mm to about 300 mm by 300 mm in various embodiments. In certain embodiments, the items can vary from about 10 mm by 25 mm to about 100 mm to about 260 mm. As can be appreciated however, the counting machines and methods described herein can also be modified to count larger items. The items can generally be of any thickness or depth.

The items to be counted can include RFID tags in certain embodiments. Although RFID tags can generally be counted electronically by use of a suitable RFID interrogator, the counting machine and methods described herein can provide useful enumeration of such RFID tags in situations where electronically interrogation is difficult. For example, the methods described herein can accurately count a stack of RFID tags without inadvertently counting other adjacent RFID tags. Advantageously, the counting machines described herein do not damage RFID tags during the counting process.

Generally, the counting machines and methods described herein can enumerate items through a sampling process that can quickly, and accurately, determine the number of items being sampled. For example, in certain embodiments, a stack of items can be counted by the described counting machines by measuring the thickness and/or weight of the stack of items and comparing the thickness and/or weight to a sampled value. In some embodiments, the sampled value may refer to a number that relates thickness or weight to a number of items (e.g., an example sampled value can relate a thickness of 5.1 cm to 510 items).

In certain embodiments, the sampled value can be automatically determined by the counting machine by providing the machine a predetermined number of items, or samples, and instructing the machine to measure the thickness and/or weight of the predetermined number of items. A processor on the counting machine can use the provided number of items and the measured thickness and/or weight to generate the sampled value. Exemplary counting machines according to some embodiments are depicted in FIGS. 1 and 3.

In some embodiments, such as in FIG. 1, some counting machines 100 may include one or more of a counting area 110 including a fixed pressure plate 120 and a moveable pressure plate 130. In some embodiments, in a counting operation, items to be counted (not depicted) are placed in the counting area 110 and then the movable pressure plate 130 is moved to push against the items to be counted. The distance between the fixed pressure plate 120 and the movable pressure plate 130 may then be measured. A control panel 140 may allow users to control the counting machine and, for example, input the number of items for calibration, read the number of items in a measurement operation, and the like.

The counting machine 100 may include one or more of the features depicted in FIG. 1, such as an on/off switch 150, an emergency stop 160, a manual ruler 170, an extended sample support 180 for supporting larger items, and an alignment bar 190 for aligning items before measuring. In some embodiments, one or both of the moveable pressure plate 130 and the fixed pressure plate 120 are configured to sense force and/or pressure, such as by including a force and/or pressure sensor or by being coupled to a force and/or pressure sensor.

In some embodiments, such as in FIG. 3, some counting machines 200 may include one or more of a power switch 210, an emergency stop 220, a guide plate 230, a pressure sensor assembly 240, a touch screen 250, a measurement head 260, a weight scale 270, and a thickness measurement slot 280. In some embodiments, the weight scale 270 may be configured to weigh items that are being measured for thickness, such as by being incorporated into a support for one or more of the pressure sensor assembly 240, the measurement head 260, and the guide plate 230.

As can be appreciated, the counting machines described herein can be modified in various ways. For example, the manual ruler 170 and extended sample support 180 can be omitted in certain embodiments. In certain embodiments, the control panel 140 can be simplified to a simple display while in other embodiments, it can display a touchscreen interface to allow for more advanced counting operations such as storing known item types. As can be appreciated, the counting machine 100 can include processor, ram, etc. (not depicted).

In certain embodiments, a moveable component (e.g., the movable pressure plate 130, pressure sensor assembly 240, or measurement head 260) can be actuated by the counting machine. In such embodiments, the movable pressure plate 130, pressure sensor assembly 240, or measurement head 260 can be actuated by any suitable means. For example, the movable pressure plate 130, pressure sensor assembly 240, or measurement head 260 can be attached to a rail and translated along the length of the counting area by a rotating screw or linear motor. In other embodiments, the movable pressure plate 130, pressure sensor assembly 240, or measurement head 260 can be attached to a movable belt that is wound to translate the movable pressure plate 130, pressure sensor assembly 240, or measurement head 260. In certain alternative embodiments, the movable pressure plate 130, pressure sensor assembly 240, or measurement head 260 can be manually actuated by the user.

The counting machines for various embodiments can include an electronic sensor to measure the distance traversed, such as by the moveable component. As can be appreciated, the distance can be measured in a variety of ways. For example, a linear or rotary encoder can be used to directly measure the distance traversed by the movable pressure plate or an indirect measurement of the motor can be used. Some embodiments may include a laser or infrared sensor for measuring the distance to a target object, such as a part of the moveable pressure plate 130, pressure sensor assembly 240, measurement head 260, or components connected to or associated with moveable components of the counting machines. In certain embodiments, the counting machines described herein can have micrometer accuracy (e.g., about ±0.001 mm accuracy).

For various embodiments, the number of items that can be counted relates to the total thickness of the stack of items. In certain embodiments, the measurable distance can vary from about 1 mm to about 16 cm, 18 cm, 20 cm, 25 cm, 30 cm, or greater. For some embodiments, the number of items that can be counted can range from about 2 pieces to about 1,000 pieces or more.

For various embodiments, the weight of items to be counted may weigh between 0.05 g to 10 g, 20 g, 30 g, 40 g, 50 g, 100 g, 150 g, 200 g, 250 g, 300 g, 350 g, 400 g, 450 g, 500 g, or greater.

In certain embodiments, the moveable component can apply a pre-determined amount of force to a stack of items to ensure consistent measurements. The pre-determined amount of force can be set automatically based on the type of item that is being measured. For example, a certain pre-determined force can be used for cloth and a different pre-determined force can be used for paper. In certain embodiments, the pre-determined force can be identical between different items to be measured.

As can be appreciated, the amount of force applied to the stack of sample items can be measured in a variety of ways. For example, the fixed pressure plate can include a mechanical force gauge or the mechanical force can be determined from the motor for the movable pressure plate. When the moveable component is actuated by the counting machine, the counting machine can automatically stop actuating the movable pressure plate, measure the distance traversed by the movable pressure plate at about the exact moment the pre-determined force is reached, and then retract the moveable pressure plate. When the moveable component is actuated by a user, the counting machine can measure and record the distance traversed by the movable pressure plate at about the exact moment the pre-determined force is reached and then notify the operating user that the measurement was completed.

In certain embodiments, the sampled value can be determined from two or more measurements. For example, the sampled value can be computed from averaging together 3 measurements of a stack of items with known quantity. As can be appreciated, performing multiple measurements can be increase the accuracy of the sampling process and/or identify quality concerns with the items being sampled.

In certain such embodiments, each of the sampled measurements can be made using a different number of items in a stack. For example, the sampled value can be generated by measuring the thickness of varying number of identical items (e.g., a stack of items about 2 cm thick, about 4 cm thick, and about 8 cm thick). An average sampled value can then be automatically computed from the set of measurements.

The sampled value can be retained and stored for future use in certain embodiments. Generally, as long as the items to be measured are not modified and the environmental conditions remain about constant, the sampled value can be retained for use indefinitely. In certain embodiments, a user can input a name into the counting machine to facilitate use of the sampled value for future measurements. In certain embodiments, a counting machine can retain over a hundred different sampled values. In certain embodiments, a counting machine can retain past counting operations.

In certain embodiments, the counting machine can offer a validation function. The validation function can be performed similarly to the sampling method. For example, a user can provide a stack of items with known enumeration and the counting machine can verify that the known enumeration matches the sampled value. If the values do not match, the machine can request additional samples to determine a new sampled value.

In certain embodiments, it can be useful to measure approximately the same number of items to increase the accuracy of the counting process. In such embodiments, the counting machine can include a ruler, or scale bar, to assist the user with loading approximately the same number of items for each counting operation.

A sample flow chart illustrating use of a counting machine in accordance with some embodiments is depicted in FIG. 2. In some embodiments, the process starts at block 200 with the counting machine asking the user what item is being counted. If the item does not have a previously recorded sampled value or the user wants to update the sampled value, the process may continue to block 210 where one or more measurements are made by the counting machine to generate the sampled value. If a sampled value is recorded in either block 200 or block 210, the process may continue to block 220 where the counting machine may measure the thickness and/or weight of the stack of items and may determine the number of items based on the measured thickness and/or weight and the sampled weight and/or thickness value. The process may conclude at block 230, where the number of counted items is reported.

As can be appreciated, variations to the process depicted in FIG. 2 are possible. For example, block 210 or 220 can further include a validation function and block 230 can include an offset value function.

In certain embodiments, deviation values can be calculated when multiple measurements are performed to calculate an average sampled value. For example, deviations value can be determined by calculating the deviation between each calibration measurement and the average sampled value. An average deviation can also be calculated. The average deviation can be calculated by adding together the absolute value of each deviation value and then dividing by the number of the number of measurements. Dividing the average deviation by the average sampled value can provide an average deviation percentage.

As can be appreciated, deviation values can be used to provide feedback to the user of the quality of measurements. For example, a high average deviation value for a particular measurement can provide warning to the user that an error is likely present. The counting machine can provide an error at any desired level such as a deviation of about 2.5% or greater, about 5% or greater, etc. Additionally, or alternatively, the average deviation value can be used to provide a confidence bound around the number of items counted. For example, for a measurement of 125 items having a 1.4% average deviation value, the counting machine described herein can, in certain embodiments, indicate that there are between 123.25 to 126.75 items.

In certain embodiments, the counting machine can automatically request recalibration of the sampled value at a predetermined time interval. For example, the counting machine can request that the sampled value be recomputed every week, every month, etc.

In certain embodiments, a counting machine can include an offset function. The offset function can offset the number of items counted by the counting machine. For example, a counting machine including an offset of 2 items can report that there are 2 less items than are actually present. The offset can be useful to ensure that sufficient items are always delivered to, for example, a production floor where an undercount would be problematic. In certain embodiments, the offset can match the accuracy of the counting machine. For example, when the counting machine is accurate to within 2 items, an offset value of 2 can be used to ensure that there are always at least the desired number of items and minimize the risk of undercounting.

In some embodiments, users may be presented with a user interface that includes options for communicating in English or Chinese. The user interface may provide options for performing one or both of a weight measurement and a thickness measurement.

For some embodiments, the system may provide options for customizing various operating parameters, such as running speed, measure speed, jog speed, zero speed, rounding value. Running speed may be the speed of the measurement head when it moves towards the labels to be measured but has not yet touched a label. Measure speed may be a speed of a measurement head or other moveable component as it moves towards the labels after it has initially touched a label. Jog speed may be a speed limit setting for manual movement of the moveable component, or an estimated maximum speed for the moveable component. For example, the speed may be electronically limited by actively braking or using a motor. Zero speed may be a speed for the moveable component as it returns to an original position. Rounding value may be an amount to round up by when a weight or thickness measurement results in a non-round number. Sample cycle may be a number of times to request samples to be taken during a sampling operation.

For some embodiments, after thickness sampling has occurred for the set number of cycles or for a user selected number of cycles, the system may provide the user with the following fields: memory, materials, copy thickness, quantity, and offset. Memory may be used to receive an input for a user selected memory field in which to store the sampling value. For example, memory slot 0 may hold information for AS12 materials, giving it a thickness of 7.160 and a label quantity of 50.

Thickness may be the result derived from the sampling test for the total stack of labels (or other items). Label quantity may allow the user to enter the number of labels being measured as a known quantity. Offset may allow the user to offset the total count to remove uncertainty. For example, if the count is 100 plus or minus 2, a minus 2 offset may be used to provide a count result of 98, which would be an accurate "at least" amount for counting how many labels or other counted items were present.

For some embodiments, the system may enable the user to set parameters for "stable time" and "rounding value." Stable Time may refer to the duration the system will require a measurement to remain stable. Requiring longer durations may result in more accurate measurements but may slow down measurements taken using the device. Rounding Value may refer to an amount at which the system will begin rounding up. For example, for a value of "5" as the Rounding Value, the system will round 50.5 up to 51.

For some embodiments, during a weight sampling operation, the system is configured to perform the designated number of sample tests and then provide fields for: material, weight, label quantity, and offset. The material field allows the user to designate the material that was weighed, allowing future measurements for the same material to use the calibrated individual weight as a basis for counting. A material code may be used to indicate not only a base material but a specific type of label, such as a label using multiple materials with or without specific patterns, style, shape, and/or appearance. The weight field may provide the averaged weight measurement from multiple samples. The quantity field may allow the user to enter the quantity of labels tested. The offset field may allow the user to designate an offset amount to account for uncertainty in testing results.

As can be appreciated, the counting machines described herein can be further modified. For example, in certain embodiments, the counting machine can include an RFID transponder. In such embodiments, the counting machine can program counted items with information such as the number of items in the counted group, manufacturing time, or even information about the intended use of the item. Additionally, or alternatively, the counting machines can include a printer. In such embodiments, the printer can print the number of items counted, the time when the items were counted, etc.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

It should be understood that certain aspects, features, structures, or characteristics of the various embodiments can be interchanged in whole or in part. Reference to certain embodiments mean that a particular aspect, feature, structure, or characteristic described in connection with certain embodiments can be included in at least one embodiment and may be interchanged with certain other embodiments. The appearances of the phrase "in certain embodiments" in various places in specification are not necessarily all referring to the same embodiment, nor are certain embodiments necessarily mutually exclusive of other certain embodiments. It should also be understood that the operations of the methods set forth herein are not necessarily required to be performed in the orders described, and the order of the operations of such methods should be understood to be merely exemplary. Likewise, additional operations can be included in such methods, and certain steps may be omitted or combined, in methods consistent with certain embodiments.

What is claimed is:

1. A counting machine comprising:
   a counting area configured to count a plurality of items, the counting area comprising:
      a fixed pressure plate;
      a pressure sensor assembly; and
      a movable pressure plate;
   one or more sensors configured to measure the distance between the fixed pressure plate and the movable pressure plate to measure the thickness of the plurality of items;
   a motor configured to actuate the movable pressure plate to apply a pre-defined force to the plurality of items; and
   a processor configured to determine the number of items in the counting area by:
      using the motor, moving the movable pressure plate toward the plurality of items until the pressure sensor assembly indicates that the pre-defined force has been reached;
      determining the number of items by comparing a sampled thickness value to the thickness of the items located between the fixed pressure plate and the movable pressure plate, wherein the counting machine is configured to automatically request recalibration of the sampled thickness value at a predetermined time interval; and
      retracting the movable pressure plate away from the plurality of items after the number of items has been determined.

2. The counting machine of claim 1, wherein the movable pressure plate is actuatable by a control signal sent by the processor.

3. The counting machine of claim 1, wherein the movable pressure plate is actuatable by a user.

4. The counting machine of claim 1, wherein the thickness of the items located between the fixed pressure plate and the movable pressure plate is measured at a predefined force.

5. The counting machine of claim 1, wherein the sampled thickness value is determined by providing a known number of items to the processor and measuring the thickness of the known number of items in the counting area.

6. The counting machine of claim 5, wherein the sampled thickness value is an average value of two or more measurements.

7. The counting machine of claim 1, wherein the sampled thickness value is stored by the processor.

8. The counting machine of claim 1, further comprising:
   a weight scale; and
   a user interface,
   wherein the processor is configured to use the user interface to provide a count of items placed on the weight scale based on a sampled weight value.

9. The counting machine of claim 1, wherein the predetermined force is automatically determined based on the type of item to be counted.

10. A method of counting items using a counting machine having a counting area, one or more sensors configured to measure distance, a motor configured to actuate the movable pressure plate, and a processor, the counting area including a fixed pressure plate, a pressure sensor assembly, and a movable pressure plate, the method comprising:
    receiving a plurality of items between the fixed pressure plate and the movable pressure plate in the counting area of the counting machine,
    using the processor, determining the number of items in the counting area by:
       using the motor, moving the movable pressure plate toward the plurality of items until the pressure sensor assembly indicates that the pre-defined force has been reached;
       determining the number of items by comparing a sampled thickness value to the thickness of the items located between the fixed pressure plate and the movable pressure plate, wherein the counting machine is configured to automatically request recalibration of the sampled thickness value at a predetermined time interval; and
       retracting the movable pressure plate away from the plurality of items after the number of items has been determined.

11. The method of claim 10, further comprising generating the sampled thickness value based on at least one measurement of the thickness of a known number of items.

12. The method of claim 11, wherein the sampled thickness value is generated by averaging a plurality of measurements.

13. The method of claim 10, wherein the sampled thickness value is saved from a previous measurement.

14. The method of claim 10, wherein the movable pressure plate is electronically actuatable by the counting machine and wherein the counting machine actuates the movable pressure plate and measures the thickness of the plurality of items.

15. The method of claim 10, wherein the plurality of items comprise either paper labels or fabric labels.

16. The method of claim 10, wherein the plurality of items comprise radio-frequency identification ("RFID") tags, and wherein the measurement is performed using a predefined force that is sufficiently low to avoid damaging the RFID tags.

17. The method of claim 10, wherein the number of items is determined using the method within 10 seconds.

18. The method of claim 10, wherein the counting machine further comprises a weight scale and a user interface, the method further comprising:
- receiving the plurality of items on the weight scale,
- measuring the weight of the plurality of items; and
- determining the number of items based on the weight of the plurality of items and a sampled weight value.

19. The method of claim 18, further comprising generating the sampled weight value based on at least one measurement of the weight of a known number of items.

20. The method of claim 18, wherein the sampled weight value is generated by averaging a plurality of measurements.

21. The method of claim 10, wherein the predetermined force is automatically determined based on the type of item to be counted.

* * * * *